Sept. 15, 1953 P. N. BOSWORTH 2,652,443
STUFFING GLAND ASSEMBLY FOR FLUID FILLED CABLES
Filed Feb. 21, 1951
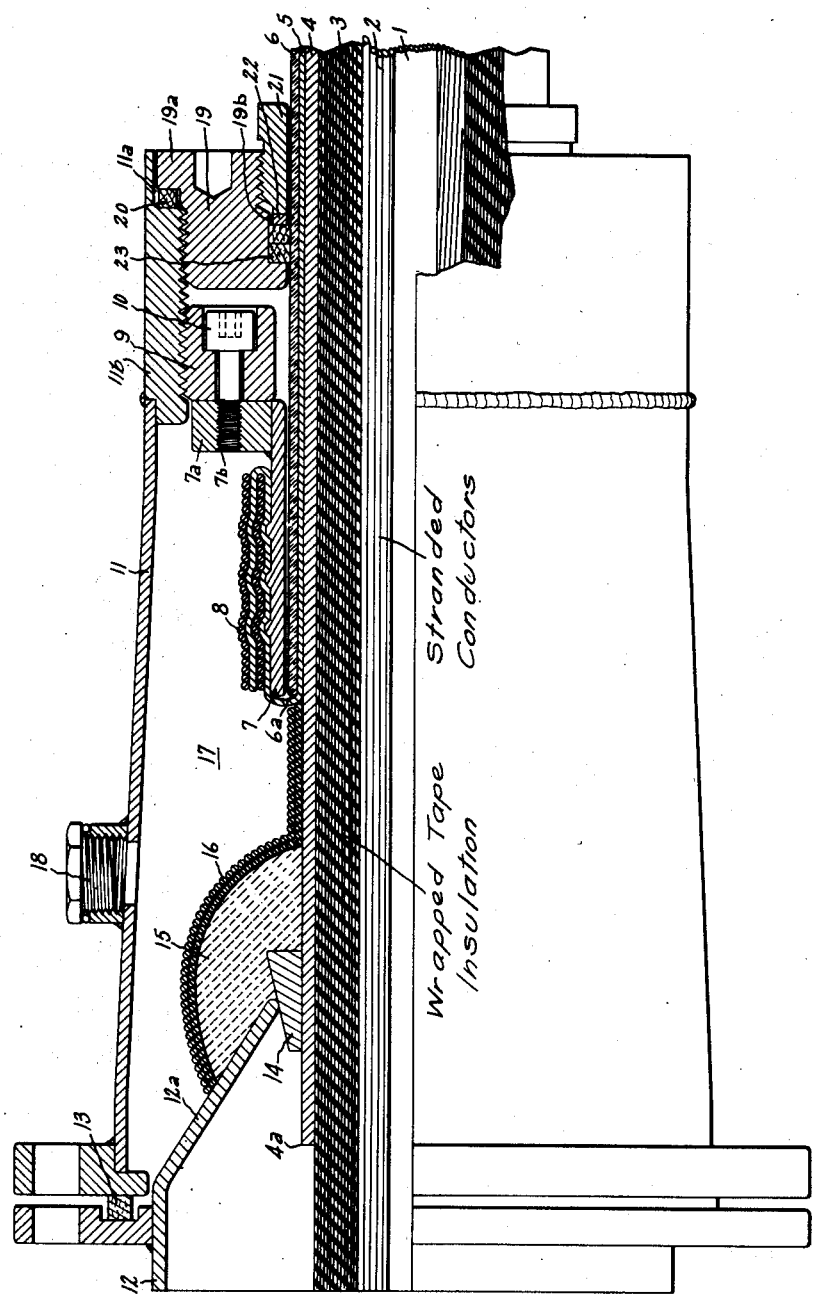
Inventor:
Phillips N. Bosworth,
by
His Attorney.

Patented Sept. 15, 1953

2,652,443

UNITED STATES PATENT OFFICE 2,652,443

STUFFING GLAND ASSEMBLY FOR FLUID FILLED CABLES

Phillips N. Bosworth, Becket, Mass., assignor to General Electric Company, a corporation of New York Application February 21, 1951, Serial No. 212,101

2 Claims. (Cl. 174—19)

This invention relates to joints in and terminals for electrical cables of the type employing a fluid insulating medium under pressure and more particularly to means for sealing the housings for the joints or terminals to the outer sheaths or jackets of the cables.

When the conductors of an electrical cable of the high-pressure fluid-filled type are joined to the conductors of a similar cable or are connected to some terminal device, such as a pothead, it is generally advantageous to allow the fluid insulating medium of the cable to surround the joint or terminal. This eliminates the need for costly barriers between the cable and the joint or terminal, such as would be necessary if the insulating medium used therein were different from that of the cable. For that reason the joint or terminal is ordinarily enclosed in a fluid tight housing which is joined to the fluid containing wall or sheath of the cable by a fluid tight seal. For applications where the fluid containing sheath of the cable is formed of lead, as is true in almost all fluid-filled cables, the housing is usually sealed to the sheath by a wiped lead joint. In order that good service may be obtained from these wiped joints, it is necessary that they be protected from the damaging effects of the atmosphere, and from mechanical stresses due both to the high internal fluid pressures and to cable movements. Since most electrical cables of the fluid-filled type contain an outer sheath which surrounds the aforementioned lead sheath, an excellent way of protecting the wiped lead joint is to encircle it with a casing which is sealed at one end to the housing for the joint between conductors and is sealed at the other end to the outer sheath of the cable. Where the outer sheath or jacket is also of lead, another wiped joint can, of course, be used. However, such construction is not feasible where the outer sheath is non-metallic, such as a rubber or neoprene jacket.

It is an object, therefore, of this invention to provide new and improved means for sealing a joint protecting casing to the outer sheath of an electrical cable of the high pressure, fluid-filled type, which will be effective even where the outer sheath or jacket is of a non-metallic material.

It is another object of this invention to provide a new and improved stuffing gland assembly for sealing a joint protecting casing to the outer sheath of an electrical cable of the high pressure fluid-filled type.

It is a further object of this invention to provide an improved stuffing gland assembly which serves both to mechanically support a wiped joint in the inner sheath of a high pressure fluid-filled cable and also to seal a casing for protecting the wiped joint to the outer sheath of the cable.

The stuffing gland assembly of this invention provides a seal between the joint protecting casing or shell and the outer sheath of the cable by a combination of two separate seals. The casing is sealed to a substantially annular gland member, and the gland member is in turn sealed to the outer sheath of the cable. The seals are made by compressing gasket or packing material between the two members it is desired to seal together. The assembly is thereby applicable to any type of outer jacket which may be used on the cable.

For a better and more complete understanding of my invention, together with additional objects and advantages thereof, reference should now be had to the following description and accompanying drawing which is a longitudinal view in half section of a portion of a fluid-filled electrical cable together with a stuffing gland assembly embodying this invention.

In the drawing is illustrated one form of self-contained fluid-filled cable with whose joints or terminals the stuffing gland assembly of this invention may be advantageously employed. The cable contains a hollow core 1 around which are positioned the stranded electrical conductors 2. Conductors 2 are insulated by means of an insulating layer 3, here formed of wrapped paper tapes impregnated with an insulating compound, from an inner lead sheath 4. Although not shown in the drawing, in certain cables of this sort a layer of metal tapes is placed between the insulation layer and the inner lead sheath for shielding purposes. To add strength to sheath 4, a reinforcing layer wound of a strong material, such as metallic tapes 5, is positioned around it. The reinforcing layer formed by tapes 5 is enclosed by an outer jacket or a sheath 6 of some resilient material, such as for example a glass-neoprene composition.

Adjacent the portion of the cable illustrated, a joint (not shown) is made between conductors 2 and the conductors of a similar cable, sheath 4 having been severed at point 4a and a portion of it removed to provide access to the conductors. Reinforcing tapes 5 were also severed adjacent point 4a, but sheath 6 was severed and the severed portion removed at a point 6a more remote from the joint.

Encircling the cable with its end nearest the joint (not shown) positioned over the end of sheath 6 is a ferrule 7 made of a conducting material such as copper. The other end of ferrule 7 is provided with a radially extending flange 7a which contains a number of tapped holes 7b. Wrapped in two layers over a portion of ferrule 7 is the portion of reinforcing tapes 5 which originally lay between points 4a and 6a. These layers are bound down by a number of turns of binding wire 8, thus clamping the end or termination of sheath 6 in place.

Ferrule 7 is firmly secured to a ring member 9 by bolts 10, which are threaded into the tapped holes 7b. The periphery of ring member 9 is provided with threads and these threads are engaged with threads on the inner surface of a thickened portion 11b of a substantially cylindrically enclosing shell 11, i. e. ring member 9 and shell 11 are in threaded engagement.

Enclosing shell 11 extends toward the joint and is secured to the housing 12 for the joint by flange and bolt means. A gasket 13 is inserted between the flanges of shell 11 and housing 12 to provide a fluid tight seal between the two.

Housing 12 has a tapered sleeve portion 12a which in sloping toward the cable extends beyond point 4a where sheath 4 ends. Placed between the end of sleeve 12a and sheath 4, so as to contact both, thereby supporting housing 12, is a ring 14 of substantially wedge shaped cross section. Ring 14 and the end portion of sleeve 12a are both formed of a metal, such for example as lead or copper, to which if it is properly tinned, semi-fluid lead will adhere upon solidification. Ring 14 serves as a base for a wiped lead joint 15, which forms a fluid tight seal between lead sheath 4 and sleeve 12a of housing 12. Wiped joint 15 is structurally reinforced by binding wire 16 in order that it may withstand the high fluid pressure within the cable. If more retaining strength is required than that provided by wire 16, the space 17 enclosed by shell 11, ferrule 7, joint 15 and the associated binding wire 16, and sleeve 12a may be filled with cast solder through the plug 18 provided in enclosing shell 11. Normally, however, this is not necessary. The clamping of reinforcing tapes 5 to ferrule 7 also provides mechanical protection for joint 15 against high internal pressures and cable movements.

Space 17 is sealed at one end by gasket 13 as hereinbefore described and is sealed at the other end by the stuffing gland assembly of this invention, the previously mentioned ferrule 7 and ring member 9 being parts of the assembly. Ferrule 7 and ring member 9, however, do not provide any seal in themselves.

The fluid tight seal at the end of space 17 remote from housing 12 actually consists of two seals, one being between shell 11 and an annular shaped gland member 19 and the other being between gland member 19 and outer sheath 6 of the cable. Gland member 19 is provided with threads along both its outer and inner surfaces. The outer threads engage those of the inner surface of shell 11 to place the two members in threaded engagement. The end portion of the wall of shell 11 contains an inner circumferential recess 11a into which a flange 19a provided on gland member 19 extends when shell 11 and the gland member 19 are threaded together. Gasket material 20 is thereby compressed between the walls of recess 11a and flange 19a to provide a fluid tight seal between shell 11 and gland member 19.

A portion of the surface of gland member 19 adjacent the cable is provided with a circumferential recess or packing cavity 19b. Threads are cut in the end portion of this recess to engage the threads provided on the outer surface of a ring shaped stuffing nut 21. Threading nut 21 and gland member 19 together force a spacer ring 22 against packing material 23 which is contained in the packing cavity of gland member 19. This compresses packing material 23 against the walls of packing cavity 19b and against the outer jacket 6 of the cable to form a fluid tight seal therebetween. This seal in conjunction with the two above noted seals completely isolates space 17 and thus wiped joint 15 from the atmosphere.

Metal tapes 5 are also protected from the atmosphere by the sealing off of space 17. It is important that tapes 5 be so protected as they are easily corroded in corrosive atmospheres with the presence of moisture. Satisfactory operation of the cable, of course, depends upon the permanence of these reinforcing tapes.

One preferred procedure of assembling the stuffing gland assembly from its component parts, assuming that sheaths 4 and 6, and reinforcing tapes 5 have been severed as illustrated and described, that the various members of the stuffing gland assembly and housing 12 and ring 14 have been passed over the free end of the cable, that the joint between the conductors has then been made, and that wiped joint 15 has been constructed and bound down by wires 16, is to first wind the free portion of reinforcing tapes 5 around ferrule 7 and bind them down with wires 8. Then gasket 13 is placed between the flanges of housing 12 and shell 11 and the two members are pulled together by some means, such as bolts, to compress gasket 13. Gasket 13 forms a fluid tight seal between the two members. Ring member 9 is now threaded to shell 11 and turned until it makes firm contact with ferrule 7. Then bolts 10 are inserted to secure ferrule 7 to ring member 9 and thus lock ferrule 7 firmly in place.

Next gasket material 20 is inserted into circumferential recess 11a and gland member 19 is threaded to shell 11. Member 19 is turned until flange 19a compresses gasket material 20 to provide a fluid tight seal between the walls of recess 11a and flange 19a.

To provide the third and final seal, first gasket material 23 and then spacer ring 22 are inserted into packing cavity 19b. Stuffing nut 21 is threaded to gland member 19 and turned until gasket material 23 is forced into firm contact with sheath 6 and the walls of packing cavity 19b to provide a fluid tight seal therebetween. Actually, if stuffing nut 21 is designed with a projection extending sufficiently into packing cavity 19b to compress gasket material 23, the need for spacer ring 22 is eliminated and it may be omitted from the construction.

While there has been described what at present is considered to be the preferred embodiment of this invention, it will be obvious to those skilled in the art that various changes and modifications may be made then without departing from the invention, and it is, therefore, aimed in the appended claims to cover all such changes and modifications as fall within the true spirit and scope of this invention.

What I claim as new and desire to secure by Letters Patent of the United States is:

1. In combination with a housing for a joint in the conductors of a fluid-filled electrical cable having a plurality of sheaths separated by reinforcing tape and having its outermost sheath terminated at a predetermined distance from the joint end of said conductors, a stuffing gland assembly comprising a ferrule including a flange encircling said cable adjacent to the termination of said outermost sheath; a portion of said tape normally extending beyond the joint end of said ferrule being bent back and laid onto the outer surface of said ferrule; a plurality of turns of wire securing said bent back portion of said tape in tight fitting engagement with said ferrule; an enclosing shell extending from said housing beyond said ferrule and having in its end portion opposite from said housing an inner circumferential recess; gasket material enclosed within said recess; a ring member encircling said cable and secured to said flange and in threaded engagement with said shell; a gland member encircling said cable in threaded engagement with said shell and provided with a flange extending into said recess to compress said gasket material and having a recessed portion adjacent said cable to provide a packing cavity; gasket material partially filling said cavity; a stuffing nut encircling said cable and being in threaded engagement with said gland member and projecting into said cavity to compress said gasket material contained therein; and means sealing said shell to said housing.

2. In combination with a joint for the conductors of a fluid-filled cable having an inner lead sheath, an outer sheath formed of resilient material, and reinforcing tape separating said sheaths with said outer resilient sheath being terminated a predetermined distance from the joint end of said lead sheath and said reinforcing tape, a sealing assembly comprising a housing for said conductor joint; a fluid-tight wiped lead joint between said housing and said joint end of said lead sheath; and a stuffing gland assembly comprising a ferrule including a flanged portion encircling said cable adjacent to the termination of said outer sheath, a portion of said tape normally extending beyond the joint end of said ferrule being bent back and laid onto the outer surface of said ferrule, a plurality of turns of wire securing said bent back portion of said tape in tight fitting engagement with said ferrule, an enclosing shell extending from said housing beyond said ferrule and having in its end portion opposite from said housing an inner circumferential recess, gasket material enclosed within said recess, a ring member encircling said cable and secured to said flange and in threaded engagement with said shell, a gland member encircling said cable in threaded engagement with said shell and provided with a flange extending into said recess to compress said gasket material, said gland member further having a recessed portion adjacent said cable to provide a packing cavity, gasket material partially filling said cavity, a stuffing nut encircling said cable and being in threaded engagement with said gland member and projecting into said cavity to compress said gasket material contained therein.

PHILLIPS N. BOSWORTH.

References Cited in the file of this patent
UNITED STATES PATENTS

| Number | Name | Date |
|---|---|---|
| 1,762,510 | Edmonds | June 10, 1930 |
| 1,943,799 | Mahan | Jan. 16, 1934 |

FOREIGN PATENTS

| Number | Country | Date |
|---|---|---|
| 533,372 | Great Britain | Feb. 12, 1941 |